United States Patent [19]

Ayers

[11] 4,049,554
[45] Sept. 20, 1977

[54] OIL SPILL CLEANUP SYSTEM

[75] Inventor: Ray R. Ayers, Houston, Tex.

[73] Assignee: Shell Oil Company, Houston, Tex.

[21] Appl. No.: 666,854

[22] Filed: Mar. 15, 1976

Related U.S. Application Data

[60] Division of Ser. No. 492,556, July 29, 1974, Pat. No. 3,966,614, which is a continuation of Ser. No. 292,028, Sept. 25, 1972, abandoned, which is a continuation-in-part of Ser. No. 225,987, Feb. 14, 1972, abandoned.

[51] Int. Cl.² .............................................. E02B 15/04
[52] U.S. Cl. ........................ 210/242 S; 210/DIG. 25; 210/416 R
[58] Field of Search ................ 210/83, 242, DIG. 25, 210/DIG. 26, DIG. 27, 416; 61/1 F; 137/189

[56] References Cited

U.S. PATENT DOCUMENTS

| | | | |
|---|---|---|---|
| 3,499,290 | 3/1970 | Smith | 61/1 F |
| 3,556,301 | 1/1971 | Smith | 210/242 |
| 3,561,601 | 2/1971 | McNeely | 210/242 |
| 3,590,584 | 7/1971 | Litzgerald | 210/242 X |
| 3,666,099 | 5/1972 | Galicia | 210/DIG. 25 |
| 3,690,463 | 9/1972 | O'Brien | 210/DIG. 25 |
| 3,703,463 | 11/1972 | Bhuta et al. | 210/242 |
| 3,707,232 | 12/1972 | Harrington et a. | 210/242 |
| 3,731,491 | 5/1973 | Marttel et al. | 61/1 F |
| 3,770,626 | 11/1973 | Ayers | 210/242 |
| 3,796,656 | 3/1974 | Arey | 210/DIG. 25 |
| 3,815,751 | 6/1974 | Pavloric | 210/DIG. 25 |
| 3,865,730 | 2/1975 | Ayers et al. | 210/DIG. 25 |
| 3,959,136 | 5/1976 | Ayers et al. | 210/242 |
| 3,966,614 | 6/1976 | Ayers | 210/242 |

*Primary Examiner*—Theodore A. Granger

[57] ABSTRACT

Skimmer for removing oil from the surface of a body of water which is articulated from front to rear to be wave conformable and/or has a quiescent collection zone formed by bottom and/or forward baffles. Flexible skimming head for use with or independently of the above skimmer composed of a foraminous sheet having an integral chevron flow pattern on its upper surface; floating skimming head for use similar to the preceeding head with a central, axially vertically movable cone or other configuration forming a suction mouth. Boom for use with or independently of the above skimmer which is composed of converging double booms. Storage capacity for oil collected by the above skimmer or otherwise composed of onboard and/or offboard membranes.

5 Claims, 14 Drawing Figures

PRESENT INVENTION
FIG. 1
PRIOR ART
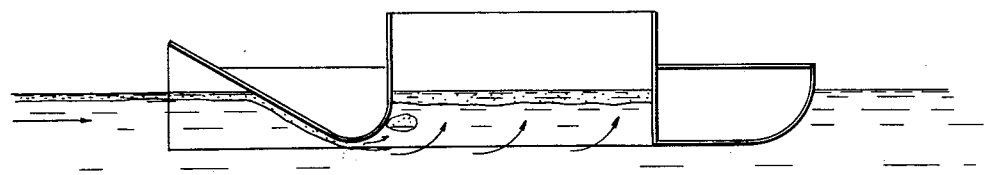
PRESENT INVENTION
FIG. 2
PRIOR ART
PRIOR ART

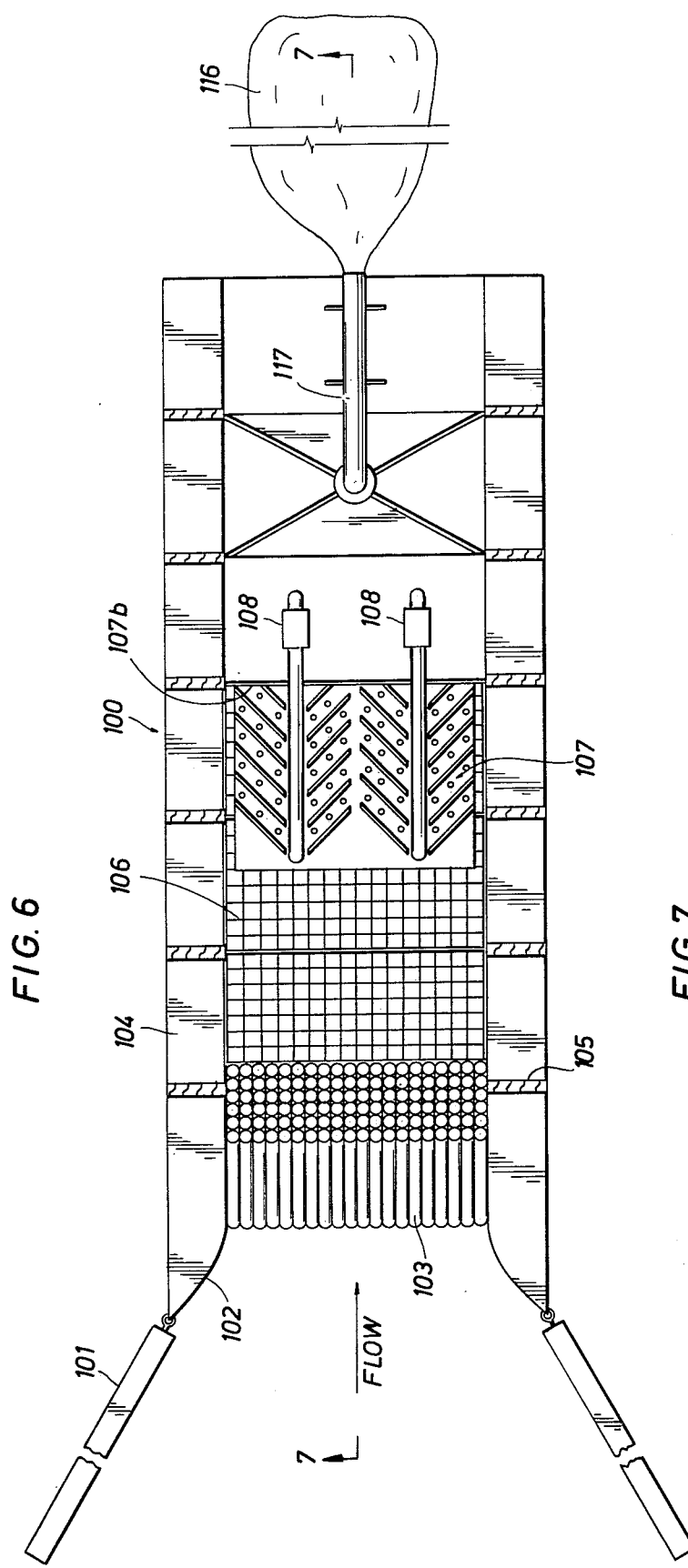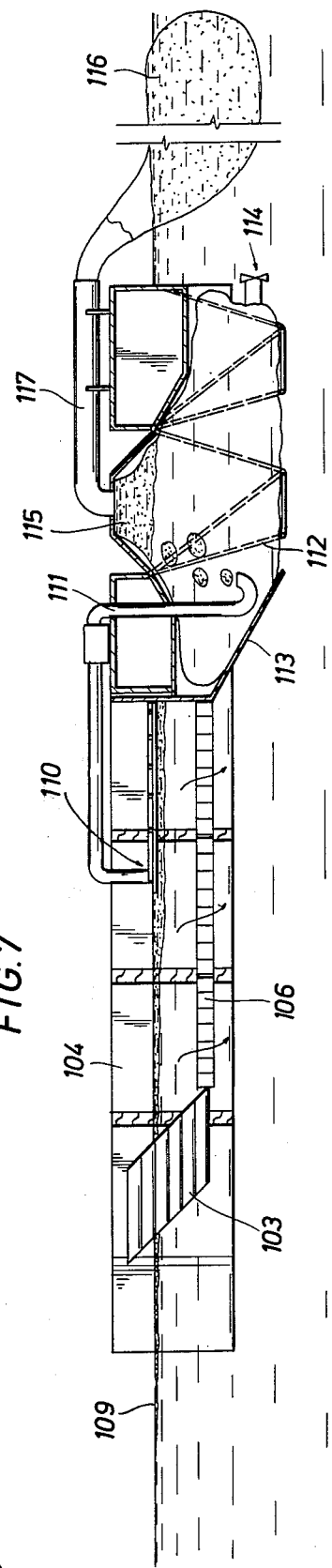

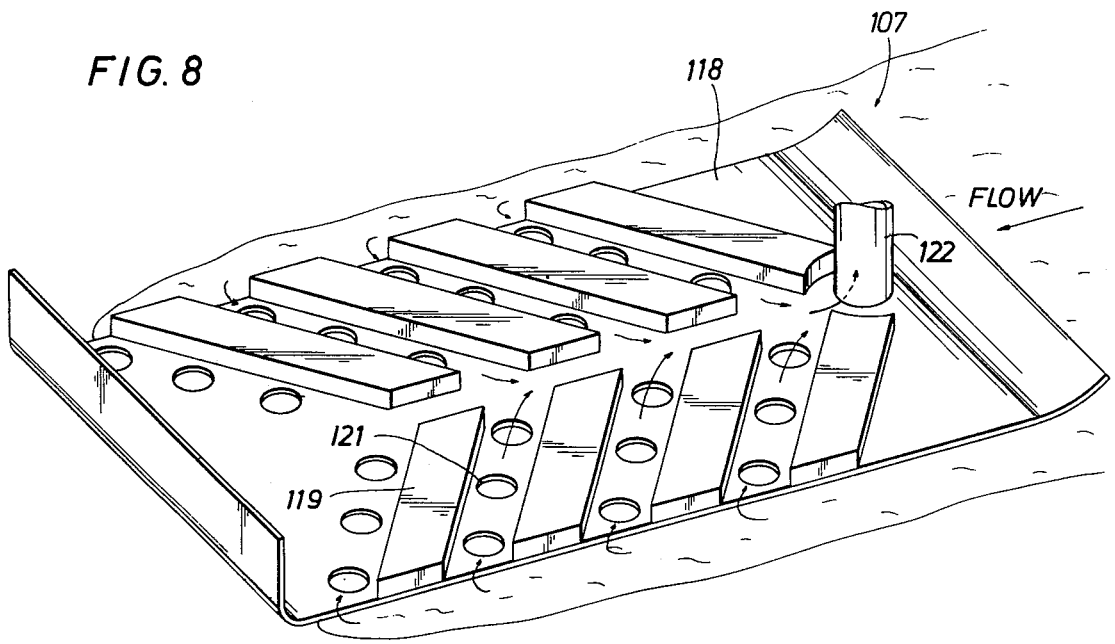
FIG. 8
FIG. 13
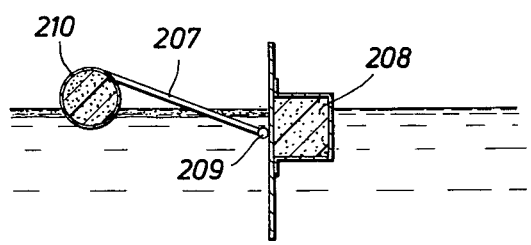
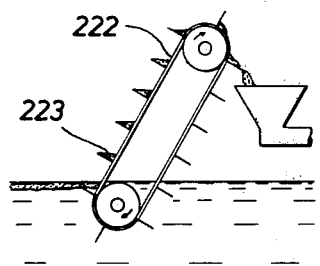
FIG. 10
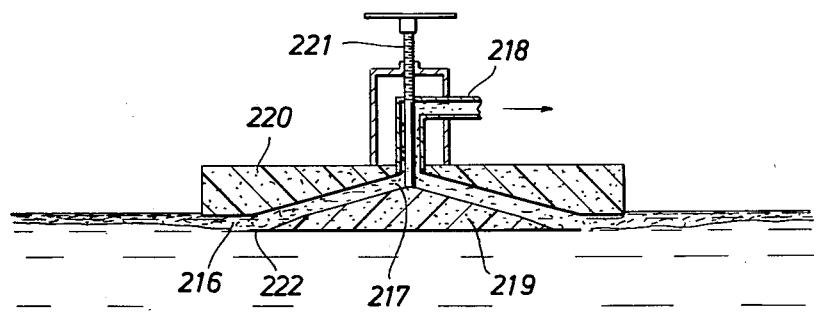
FIG. 9

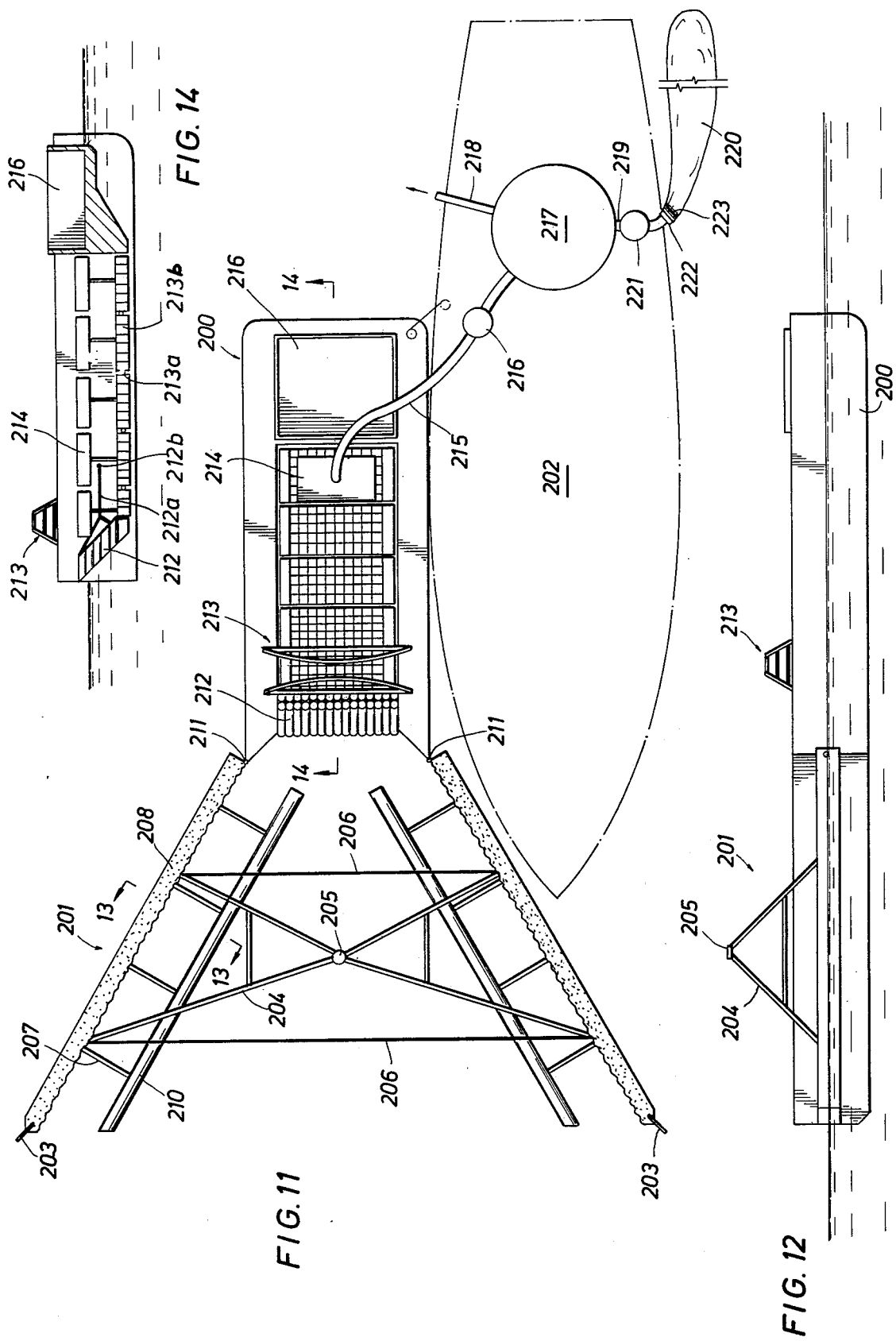

OIL SPILL CLEANUP SYSTEM

This is a division of application Ser. No. 492,556, filed July 29, 1974, now U.S. Pat. No. 3,966,614 which is a continuation of application Ser. No. 292,028, filed Sept, 25, 1972, now abandoned, which in turn is a continuation-in-part of application Ser. No. 225,987, filed Feb. 14, 1972, now abandoned.

BACKGROUND OF THE INVENTION

Much effort has been expended toward the development of systems for collecting oil both inshore and offshore. Results from these efforts have not been particularly encouraging. Major problems have been encountered in oil escapement from boom-skimmer arrangements due to the effects of waves as well as currents and due to structural strength and stability difficulties. The various structurally oriented troubles that have confronted investigators conducting sea tests of prototype equipment are actually easier to rectify for they are within the realm of accomplishment. The oil escapement problems caused principally by wind, waves, and currents on the other hand are a severe challenge, because the solution requires a significant advancement in the state of the art of oil spill clean-up technology. Accordingly, the present invention provides several basic departures from other concepts which have been utilized in the development of various equipment for cleaning oil spills.

Tests conducted with prior art skimming vessel devices have shown that oil can escape boom-skimmer arrangements while influenced by the orbital water particle motion associated with modest 3 foot waves in negligible currents and that rigid skimming vessels allow oil to escape because of a lack of conformance of the skimmer with respect to the wave profile. Based on such tests, the skimming system configuration of the present invention was developed with a skimming vessel which is articulated along its length with regard to the sides of the vessel and/or its bottom baffles, thereby providing conformance superior to prior art skimming vessels by moving like a roller coaster over the waves. When presented with oil in a towing tank, the skimmer of this invention, because of its excellent conformance characteristics, collected in excess of 95% of the oil presented at a forward velocity of 1.7 feet per second and a wave height-to-length ratio of 1/9, where by comparison a conventional skimmer would be ineffective.

Secondly, the present invention provides a means for containing oil at a current velocity magnitude twice that for a conventional oil skimmer. Oil can be contained with the device of this invention with less than 5% throughput loss at a velocity of 2 feet per second where conventional concentrating skimmers are limited to a maximum velocity of 1.25 feet per second. The basic principle involved is to slow down the effective current inside the concentration area while at the same time allowing the oil to enter horizontally. In the process of this invention, the oil is retained on or quite near the surface of the water within the confines of the concentrator for skimming. The virtually horizontal path of the oil into the concentrator is important in the instance of heavy weathered oils and emulsions because any forces tending to push the oil downward will result in oil sweeping under and past the skimming vessel prior to re-surfacing.

Thirdly, in order to increase the skimming capacity of skimming systems, the prior art has resorted to the use of oil booms as a means of increasing the effective width of the skimming vessel. Inasmuch as booms will allow oil underflow in currents or under tow unless all portions of the boom are held at an acute angle with the current, the prior art practice has in one case resorted to using a rope or cable harness to restrain boom elements into a "V" shape in front of the skimming vessel rather than allowing the boom to take the natural catenary shape. Difficulties with the harnessed "V" arrangement, which is itself an improvement over the natural catenary used previously, still exist. First, the harness tends to foul or entangle in use, thereby causing the V configuration to "buckle". Secondly, the two forward towing vessels must remain at a proper distance apart so as to retain the boom configuration, a requirement which is difficult to fulfill in appreciable waves and currents. Thirdly, the rope harness near the surface of the water during towing or in currents will tend to emulsify the approaching oil slick, thereby making skimming more difficult. The present invention provides a converging double boom diverter which overcomes these problems.

Accordingly, it has been concluded that the best approach to a skimming system lies in combining the above noted oil concentration concepts which yield high oil-to-water ratios at high current velocities with the articulated skimming vessel concept which allows excellent wave conformance characteristics, as well as providing an effective forward diverting boom device. The present invention therefore overcomes difficulties due to wave conformance inadequacies and low current limitations, thus providing a successful and economical solution to the problems of the prior art, as will be apparent from the following description thereof.

SUMMARY OF THE INVENTION

The primary purpose of this invention resides in providing apparatus whereby an oil slick can economically and efficiently be removed from the surface of a body of water.

The above purpose has been achieved by providing a novel skimmer and other apparatus which enhances its effectiveness. The apparatus of this invention broadly extends to (1) a device for removing oil from the surface of water which is a skimming vessel articulated from front to rear to be wave conformable; (2) a device for removing oil from the surface of a body of water which is an oil concentrator having a quiescent collection zone formed by forward baffles or ports which permit substantially horizontal entry of the oil to the zone and bottom ports or baffles which permit downward exit of water from the zone; (3) two devices for removing oil from the surface of a body of water, one of which is a skimming head composed of a flexible formaminous sheet which conforms with waves and allows oil to percolate upward therethrough to a collection region provided with means to withdraw oil therefrom, and the other of which is a highly buoyant, flexible pad or sled having a downward protruding, vertically adjustable section to facilitate the application of suction to remove the oil trapped between the pad and the water below; (4) a forward diverter for mechanically concentrating oil on the surface of a body of water composed of converging double booms, the inner booms of the converging booms being of flexible foam and the outer booms being preferably but not necessarily corrugated, with the booms being joined by a centrally hinged truss and elastic cables which allow the booms to flex to wave surge forces by raising or lowering the hinge point; (5) a device for storing and settling an oil-water mixture within a collection vessel which is a membrane or bag substantially disposed in the water and flexibly connected to the vessel, whereby the oil-water mixture settles into an upper oil layer and a lower water layer in the membrane, a mixture entry port disposed in the membrane beneath the oil layer, a water exit port disposed in the membrane substantially away from the entry port and beneath the oil layer, and an oil exit port disposed substantially at the top of the membrane; (6) a device for storing oil offboard a collection vessel composed of an elongated cylindrical plastic membrane or bag having strength just sufficient to contain oil when the membrane is disposed in water and having a length to diameter ratio greater than 5, a compressible stopper or other means for plugging the open end of the membrane when filled, means for binding or otherwise attaching the neck of the membrane to the stopper or other closure, and means for pumping oil out of the membrane while the membrane remains in the water; (7) a device for chemically concentrating oil on the surface of a body of water composed of a skimming system having forward nozzles or other means for dispensing surface active chemical agent ahead of the skimmer to concentrate the oil into the path of the skimmer.

Within the framework of the above described apparatus, the present invention not only solves the above mentioned problems of the prior art, but also achieves further significant advantages as will be apparent from the description of preferred embodiments following.

BRIEF DESCRIPTION OF THE DRAWINGS

FIGS. 1 and 2 compare features of the present invention with the prior art;

FIGS. 6 and 7 are top and sectional views, respectively, of another embodiment of the invention;

FIGS. 8-10 are views of skimmer heads; and

FIGS. 11-14 are plan, profile and sectional views, respectively, of other embodiments of the invention.

DESCRIPTION OF THE PREFERRED EMBODIMENTS

FIGS. 1 and 2 compare significant features of the present invention with the prior art. FIG. 1 shows the advantages of articulation. It is apparent that the mouth of the articulated skimmer does not rise above the surface of the water. On the other hand, the mouth of the prior art skimmer does periodically rise above the level of the water so that oil is missed. FIG. 2 discloses the advantages of providing a forward baffle which permits horizontal entry of the oil into the skimmer while still functioning to dampen wave action. Among the prior art devices, one device pushes the oil down before it can rise into the skimmer so that, especially with heavy oils, much does not rise in time to be collected, and the other device, a conventional floating box skimmer, allows waves to enter the skimmer with a resultant loss in efficiency.

Figure 3:
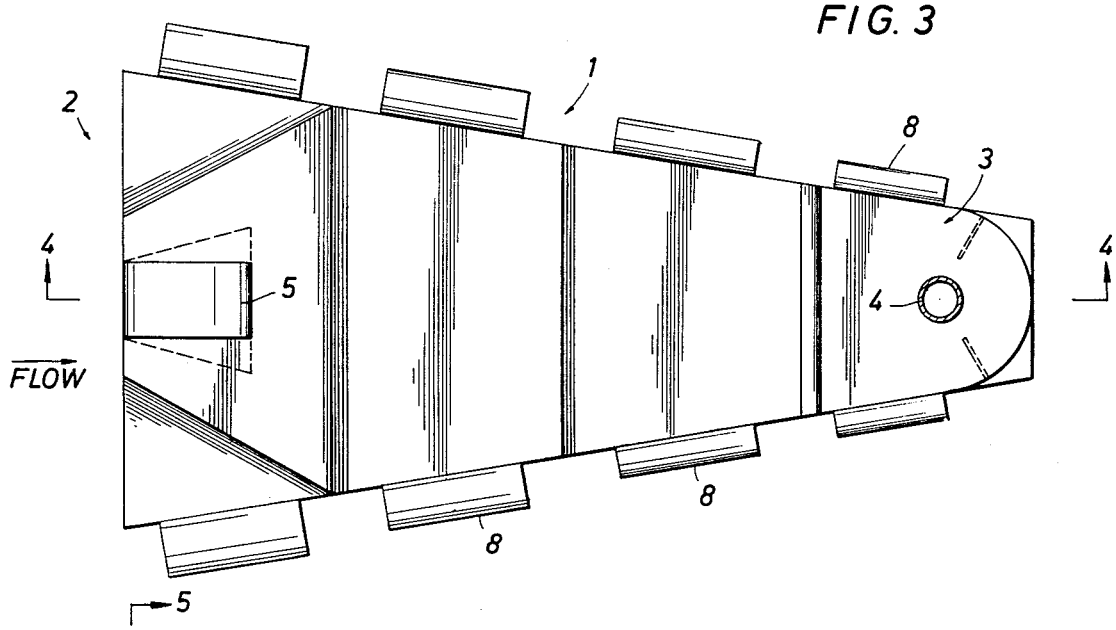
FIGS. 3-5 are plan, sectional and front views, respectively, of one embodiment of the invention.
Figure 4:
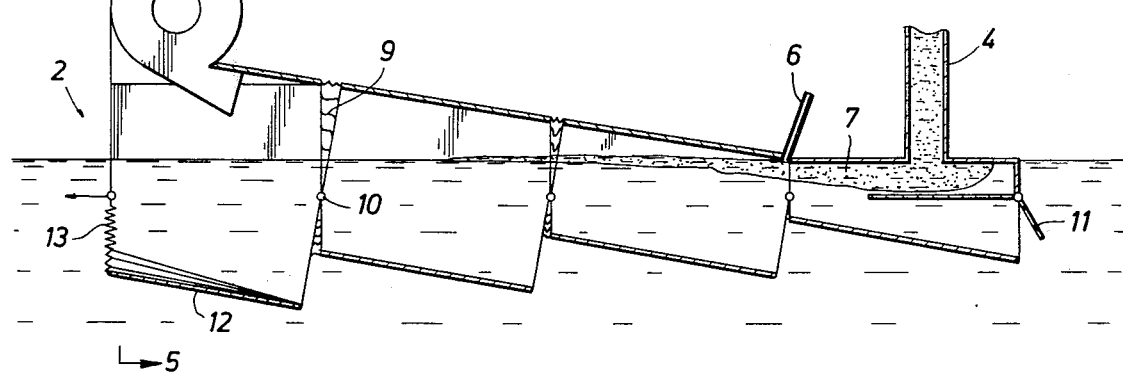
Figure 5:
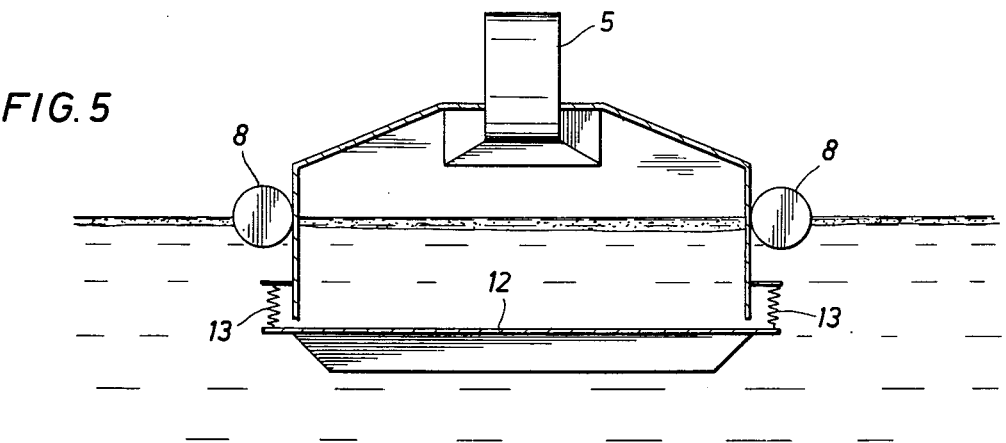

The apparatus of a first embodiment, as depicted in FIGS. 3-5, includes skimmer structure articulated to allow wave conformance during towing or dynamic positioning, an optional wind tunnel to thicken the oil lens at the suction area and a sump design that permits suction at the top of the oil lens without differential movement between the suction pipe and supporting ceiling and the oil lens. The skimmer may be one component of a sweep system having as other components diversionary booms, towing vessels and a pumping-storage vessel. Also, the skimmer may be considered as a primary separation means and secondary separation may be combined with the pumping-storage equipment.

The skimmer of FIGS. 3-5 may be compared with other conventional means of skimming in various ways. Thus, the present device, which can be unmanned, has a means of positioning the suction at the top of the oil lens and minimizing differential movement between the oil lens and the suction pipe. Conventional discrete skimmers cannot maintain the weir at the oil level in waves. The overflow sluice gate design of a conventional floating box skimmer as shown in FIG. 2 allows a significant amount of water to enter and requires a man on board to adjust the gate. By removal of excess water at selected intervals along the skimmer of the present invention, the entrance flow is reduced thereby minimizing the total amount of fluid to be processed. In the floating box skimmer excess water is released only at a single rearward location, giving rise to local turbulence problems.

Referring now specifically to FIGS. 3-5 of the drawings, the overall configuration of skimmer 1 is in the form of a wedge with the broad end of the wedge facing into the direction of flow. By means of this converging design, oil which passes into the mouth 2 of the skimmer is thickened to form a suitable lens thickness at the rear 3 of the skimmer whereat is positioned a pump suction 4 for removing oil collected in the rear of the skimmer and disposing of it by various means. Optional blower 5 functions to force the oil into the rear of the skimmer where it may be thickened and withdrawn; operatively associated with the blower 5 is air exhaust 6 which improves the efficiency of the blower. As may be seen, more particularly in FIG. 4, oil 7 acquires a considerable thickness as it approaches the rear of the skimmer. The skimmer is provided with floats 8 on either side which function to keep the skimmer afloat. The floats are joined by a flexible joint 9 such as a fabric joint which allows the floats to articulate and conform to wave action. Midway of the joint is a hinge 10 which may be of any suitable variety, preferably one which is corrosion resistant. Water is removed from the rear of the skimmer at outlet 11; it will be noted that this outlet is positioned below the maximum thickness of the oil in the rear of the skimmer. A front flap 12 is positioned at the front of the skimmer by means of springs 13 which attach to the walls of the floats and allow vertical movement due to wave pitch forces. Flap 12 is at an angle to flow so that current does not tend to pull the front part of the skimmer beneath the water.

A second embodiment of the sweep skimming system of this invention is shown in FIGS. 6 and 7 of the drawings. It may be generally pointed out that this skimmer, like the skimmer of the first embodiment, is also provided with articulation for wave conformance. The length of this skimmer should be such that the articulation length divided by the designed wave length is between 0 and about 0/3, meaning that the 0 limitation would be a continously flexible strength. As an initial point of departure from the first embodiment, this skimmer is also provided with forward baffles which allow horizontal entry of oil to the collection region, rather than pushing oil downward as is the case with some prior art skimmers. The baffles also serve as a wave dissipator as well as a wave surge dampener. Where the baffles are tube bundles, standard walled tubes with diameters between 1 inch and 4 inches and a length to diameter ratio between about 3 and about 12 are suitable; in the case where other types of baffles than tubes are used, an equivalent calculation may be made. Further, there are provided within the skimming vessel lower submerged baffles somewhat like the grid network of an egg carton or a soft drink case with the bottom removed, which allow displacement of water from the collection zone. By contrast, similar baffles of one prior art device allow oil to flow upward and water downward as distinguished from the present scheme. In the lower baffle system of this invention, openings of about 2 inches square to about 6 inches square, or the equivalent, and depth to width ratios between about 1 and about 5 are suitable. Baffle sizes may be gradually tapered from forward to rear, the sizes being smaller toward the rear. The quiescent pond length above the lower baffles is between about 3 and about 30 feet, depending upon the severity of wave action. As a further distinguishment, a preferred skimmer design of this second embodiment may be provided with a floating foreminous sheet which conforms with the waves, allowing oil to percolate upwards into a chevron pattern formed by a foam float arrangement, after which oil is channeled to a pump suction location. However, substantially any available skimming head may be used with the invention. In this embodiment there is also provided optional onboard settling-storage. The bag or membrane provided for this means is used instead of a rigid metal tank or container because the heavy container would add mass to the rear articulations causing their natural periods of pitch to be larger than the forward part of the skimmer, thus causing poor wave conformance. An optional trailing storage bag or membrane may be filled by the skimmer pumps by closing off a water port and floating the oil out of the storage-settlement bag.

Specifically referring now to FIGS. 6 and 7 of the drawings, the plan view of FIG. 6 shows the general shape of skimmer 100 to have substantially parallel sides. This is a suitable arrangement inasmuch as this skimmer is provided with optional diversionary booms 101 which function to channel the oil into the skimmer. Also, the skimmer is provided with built-in deflection means as shown at 102 which is curved to encourage smooth entry of the oil into the skimmer. Forward baffles 103 are ports or openings horizontally disposed which permit horizontal wave entry. Such ports may be tube bundles as shown or may be of other design such as created by alternating flat and corrugated sheets or by honeycomb structure. These baffles and the length of the skimmer are connected on either side by modular flotation cells 104 which are articulated by means of hinges 105 to permit wave conformance. Submerged baffles 106 form the collection zone of the skimmer; such baffles are comparable, as above noted, to the grid of a soft drink case without its bottom. In the rear part of the collection zone above the submerged baffles and in front of the rear substantially vertical wall 107b wherein skimming is performed is provided a flexible foraminous sheet 107 more clearly shown in FIG. 8 and further described hereinafter. Other debris and oil skimming heads, for example those of FIGS. 9 and 10, may be used. Referring again to FIGS. 6 and 7, a pumping zone follows the flexible skimming head and in this case dual pumps 108 are provided to remove oil from the skimmer head. In FIG. 7 it is apparent that oil layer 109 thickens below pump entrance 110 and is removed by means of piping 111 and passed into a settling-storage zone composed of a bag or membrane containing both water and oil. The membrane is enclosed by a harness 112 which attaches the membrane to the skimmer. At the forward end of the membrane is provided a flow deflector 113 which keeps current forces from interfering with the function of the membrane; water exits from the membrane at outlet 114 while oil 115 collects at the top of the membrane and is removed therefrom to an additional storage bag or membrane 116 via line 117, which storage membrane may be detached when full. Although the embodiment of FIGS. 6 and 7 is shown as if constructed primarily of metal, it could also be constructed using air and water filled fabric where practical, such as in the flotation 104 to facilitate air transport for use in tanker spills.

With reference to the floating flexible chevron skimmer head 107 as depicted in FIG. 8 with a single suction area, there is provided a flexible, submerged foraminous sheet 118 atop which is positioned foam floats 119 in a chevron pattern; oil and water pass under the forward end of the sheet 118 after which buoyant forces cause the oil to percolate through the holes into channels formed by placement of the flotation elements and thence to the foward part of the device where suction is taken. This type of head is most useful with light to intermediate, substantially clean oils. The bottom holes of the skimming head are of a size between about ½ inch and about 4 inches in diameter, the holes closer to the suction point being the smallest. Of interest is the fact that the oil flows naturally "upstream" to the suction location even when the pumps are not working. It is, of course, evident that other types of arrangements may be provided on top the flexible sheet other than the chevron float arrangement shown.

Another type of head which is useful for picking up both oil and debris particles up to about two inches in diameter is shown in FIG. 9. Oil 216 beneath the flexible floating skimming head is admitted via an adjustable cut 217 and pumped out via line 218. The cut is formed by cone 219 which drops beneath the floating pad 220 by means of threaded connector 221. It is not essential that the cut be formed by a cone inasmuch as any other configuration may be used which cooperates with the pad to form a valve-like arrangement. Disc 222, which is larger than the cone, is attached to the bottom of the cone. For the floating suction skimming head the particle size capability is of a size up to about 2 inches and the minimum draft of the floating suction pad is less than 2 inches. Both the skimming head of FIG. 8 and that of FIG. 9 are intended for use in thick oil layers provided for instance by the concentration means described herein.

In FIG. 10 is shown a third form of skimming head which is a foraminous conveyor 222 to which is attached flights 223 which pick up large oil-soaked debris which cannot be easily picked up by the previous skimmers, for example bottles and oil-soaked straw. The skimming head of FIG. 9, for example, can then be used behind the conveyor to remove the remaining oil. The mesh size of the metal conveyor mesh and flights attached thereto are the equivalent of about 1 inch square to about 3 inches square. The flight length, which is the distance from the belt to the end of the flight, is from about 6 to about 18 inches.

Another embodiment of the invention as shown in FIGS. 11-14 is particularly intended for use inshore with a chemical active agent which functions to herd an oil slick into a channel so that it may be more easily collected by the skimmer. A suitable agent is a primary long chain alcohol having from 10 to 20 carbon atoms with a polar containing aliphatic solvent. This embodiment of skimmer, in addition to employing chemical diversion, utilizes an elastic double boom V diverter for mechanical diversion, a rigid Catamaran hull with self-floating articulated baffles for concentration and a previously mentioned skimming head for oil removal. Of the skimming part of the embodiment it may be generally said that the rigid Catamaran encloses a separately buoyed articulated submerged baffle system in the collection area and a rearwardly hinged flow-controlling tube bundle baffle in the forward section, in addition to a unique floating suction skimming head with an adjustable layer cut capability, described hereinabove. As with the previous embodiments, other types of forward baffles and skimming heads may be employed. There is also included an aft compartment for equipment or a worker; pumps can alternatively be placed on a support vessel. In the diversion part of the invention as above noted, there is provided an elastic V configuration which flexes with imposed forces. The boom is a double boom design which is an improvement over conventional designs although such designs may alternatively be employed with this skimmer. The forward boom, which is merely a continuously flexible weighted float, will pitch with the imposed wave forces and the rear boom is a substantially vertical skirt which is stiffened more than the forward one to provide structural integrity. A unique feature of this diverter is the means or structure by which the converging double booms are elastically joined to provide wave surge dampening. While the sweep width of the diverter is large, using a chemical agent to herd the oil, the slick can be chemically diverted prior to reaching the mechanical diverter. With a high pressure pump, the spray can be placed 40 to 60 feet in advance of the diverter. As to support equipment, it is usually necessary to provide a work boat for propulsion. Oil can be pumped to a small separator on the work boat prior to being stored in oil bags. Oil and surface active agent pumps can be placed on the work boat or in the skimmer.

Referring now specifically to FIGS. 11-14 of the drawings, there is generally shown in the plan view of FIG. 11 a Catamaran type hull 200 which is preferably aluminum. In front of the hull is positioned a double boom arrangement 201 although other booms may be used or, for that matter, no boom at all. The entire apparatus is shown in profile in FIG. 12. A support vessel 202 is positioned beside the skimmer and forward booms. The double boom arrangement is provided with a chemical surface active agent ejection nozzle 203 at the lead part of each boom which functions to spray a chemical agent ahead of the device for purposes of concentrating the oil so that it may be more readily picked up by the skimmer. The rigid tubular superstructure 204 combined with elastic ropes 206 form a stable structure to maintain the V configuration of the double booms and keep them from spreading apart. The tubular structure is centrally hinged at 205. By elevating the hinge point, the booms may be pulled together. As the angle of convergence of the V decreases, the elevation of the central hinge increases and as the angle increases, the elevation decreases. The nature of the structure is that the converging booms always exhibit a symmetrical V shape. A cross-section of the double boom is shown in FIG. 13 taken along section lines 13—13 in FIG. 11. From this cross-section it will be seen that the double boom consists of a spreader bar 207 which is connected to a torsionally stiff boom composed of a rearward float on a flat or corrugated skirt 208 by means of a hinge 209, the axis of corrugation being vertical. The other boom 210 is a weighted continuous, flexible float as above noted. The booms are hinged to the skimmer by hinges 211 at either side of the skimmer. The float and baffles arrangement in the skimmer is more particularly shown in FIG. 14 along section lines 14—14 of FIG. 11. Thus, it will be seen that forward baffles 212, which may be hinged by means of forked arm 212a and hinge 212b, are provided as in the second embodiment along with submerged articulated baffles 213b connected by hinge 213a. Baffles floats 214 are positioned to each side inside the Catamaran. A bridge 213 provides structural rigidity for the Catamaran. A floating suction skimming head 214 is provided with a suction hose 215 which permits passage of the oil into the support vessel 202. Other types of skimming heads may of course be used. In the rear of the skimmer is provided a compartment 216 which may be utilized for equipment such as a gasoline pump or in which a man may stand to operate the skimmer.

The oil-water mixture coming aboard vessel 202 via line 215 is pumped by pump 216 to surge tank 217 wherein the oil is allowed to separate from the water. From the surge tank, water is pumped out via line 218 and oil is pumped by line 219 and pump 221 into membrane or bag 220 which is an elongated, cylindrically shaped container having, for economy, strength just sufficient to contain oil when the bag is disposed in water, and having a length to diameter ratio larger than 5. A compressible stopper 222 may be provided for plugging the open end of the membrane and means 223 is provided for binding the neck of the membrane to the stopper. A closable tube (not shown) may be provided in the stopper for pumping oil out of the membrane while the membrane remains in the water, the membrane having been left in the water for subsequent disposal of oil therein after being filled with oil and separated from the collection vessel.

It will be appreciated that the various skimmers, booms, storage membranes, skimming heads, and the like of this invention as above described may be used interchangeably with good results. However, the embodiments shown generally depict preferred arrangements. Also, while the skimmer has been generally described as a vessel, it is evident that some embodiments may be employed in a non-floating manner by attachment of the device to independent supporting means.

I claim as my invention:

1. Apparatus for removing oil from the surface of a body of water comprising a skimming head of a single floating flexible non-absorbent perforated sheet which conforms with waves and is upturned at least at one end to permit the waves to pass thereunder and allows buoyant forces to percolate oil upward through the perforations in the sheet and flow unassisted along the upper surface of the sheet through flow directing floats to a collection region provided with means to withdraw oil from the upper surface of the sheet.

2. The apparatus of claim 1 wherein the perforations have a diameter of from about ½-inch to about 4 inches.

3. The apparatus of claim 1 wherein the perforations are located in the spaces formed by a chevron pattern of floats.

4. The apparatus of claim 3 wherein suction is provided at the forward end of the sheet, based on relative movement between the sheet and the body of water, and the chevron pattern is arranged to direct oil flowing unassisted toward the forward end.

5. The apparatus of claim 2 wherein the perforations are smaller closer to the suction.

* * * * *